May 29, 1923.                M. SCHLING                1,456,653
SEED SOWER
Filed July 21, 1922
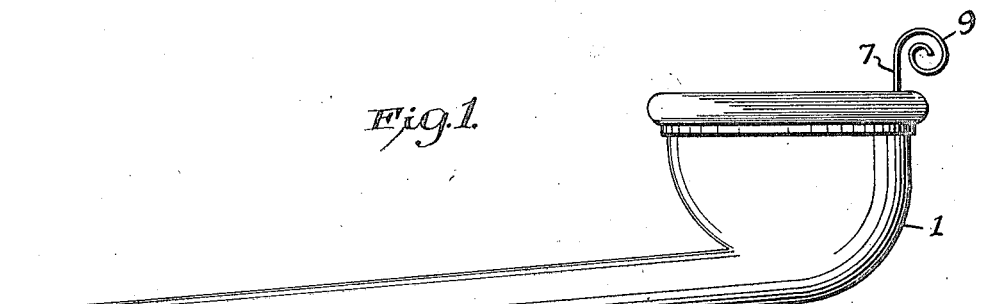
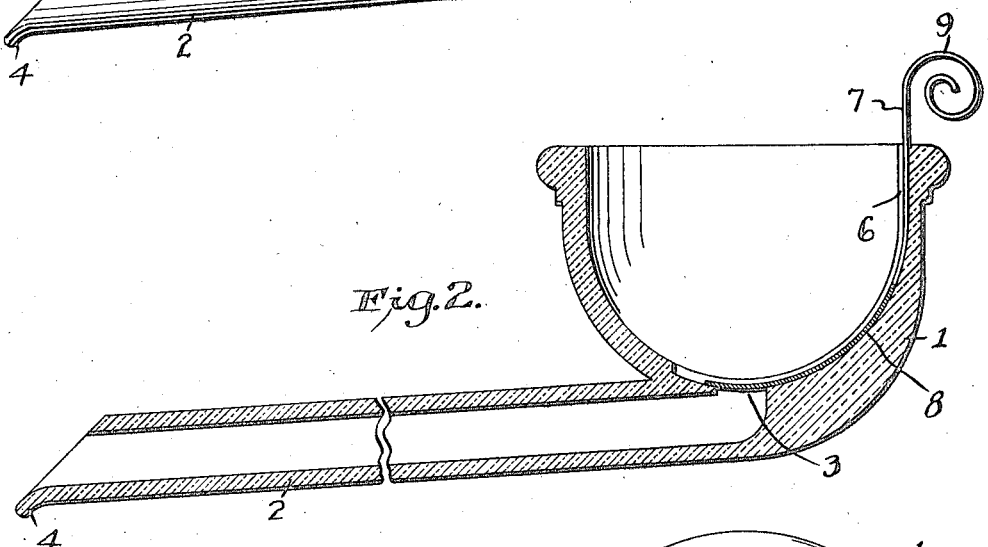
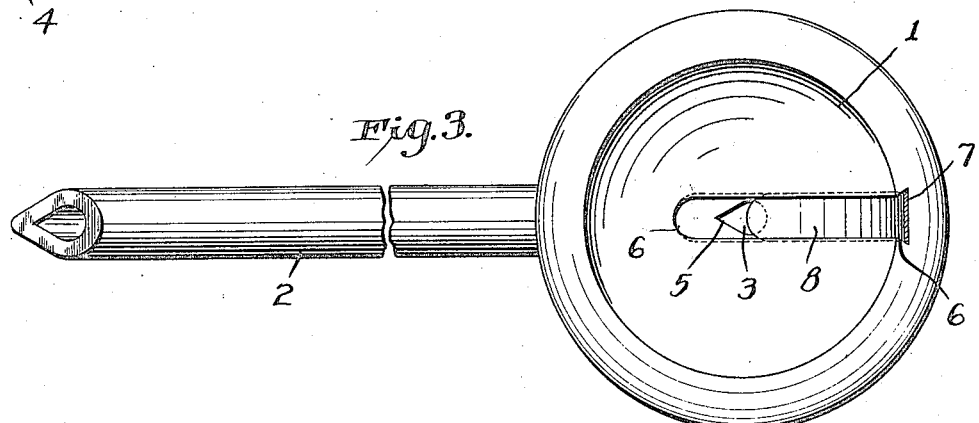
INVENTOR
Max Schling
BY Clarence Walsh
ATTORNEY Patented May 29, 1923.

1,456,653

UNITED STATES PATENT OFFICE.

MAX SCHLING, OF NEW YORK, N. Y.

SEED SOWER.

Application filed July 21, 1922. Serial No. 576,430.

*To all whom it may concern:*

Be it known that I, MAX SCHLING, a citizen of the United States, residing at 785 Fifth Avenue, in the city of New York, in the county of New York and State of New York, have invented a new and useful Improvement in Seed Sowers, of which the following is a specification.

When seeds are sown by hand in the ordinary manner, especially the finer flower seeds, it is practically impossible to sow them in such a way that each developing plant will stand in the seed box, free by itself. Commonly, there will be three or four young plants; or, if the person who sowed the seeds was not an expert, it frequently happens that whole clumps of young plants come up so close together that part of the plants by replanting or by being taken apart become damaged. Especially in the case of the more expensive seeds is it important that they be sown loose so that each little plant will have room to develop by itself and can be easily taken out of the ground and replanted without injury.

The object of this invention is to provide a hand device or seed-sower which will make it possible to sow seeds broadcast, each seed as far from the others as may be necessary. In this way, loss will be prevented, and the gardner as well as the amateur will be enabled to secure improved results.

In the accompanying drawings, forming a part hereof:

Fig. 1 is a side elevation of the seed-sower;

Fig. 2 is a vertical longitudinal section on a larger scale, the sowing tube being broken away intermediate its ends, the flexible slide being shown in position closing the regulable seed opening; and Fig. 3 is a plan view, showing the slide partly uncovering the seed opening.

The seed-sower is pipe-shaped and comprises a bowl 1 for the seeds and an elongated laterally projecting sowing tube or stem 2, made of glass so that the feeding of the seeds from the bowl to the tube can be seen.

The bowl has its sides merging into a curved bottom, in the center of which is a seed opening 3 of special form. The tube 2 projects laterally from the bottom of the bowl for a distance of a few inches, and the opening 3, communicates with the top of its longitudinal passage, at the rear or inner end of the tube. The free end of the tube is formed as if cut off diagonally from the top down, producing an extended lip 4.

The opening 3 is preferably substantially pear-shaped, that is to say it tapers toward the forward end 5, which points in the direction of the tube, and is wide and preferably rounded at the rear end.

An undercut groove 6 is formed in the interior of the bowl, extending down the side farthest from the tube and thence curving forward into the bottom sufficiently far to include the seed opening. In this guide is inserted a slide 7 consisting of a flexible band of metal 8, the upper end of which is extended above the bowl and preferably rolled to form a handle 9. By grasping this handle and moving the slide up and down its inner end is caused to move over the seed opening, closing or opening it more or less according to the size of the seed and the rate of feed desired. It will be noted that as the slide is advanced its end approaches the point of the tapering end 5 of the opening, so that an effective wide-range regulation is secured. A seed-sower constructed substantially as herein described is, for convenience, referred to as pipe-shaped, since, in form, it resembles the common form of smoking pipe, and by the term "pipe-shaped" in the claims is meant shaped in the form of an ordinary smoker's pipe.

What is claimed as new is:

1. In a device for sowing fine seeds, a pipe-shaped seed-sower comprising a bowl, constituting a seed-hopper, adapted to be held in the palm of the hand, a tubular stem communicating with said bowl, and means for controlling the flow of seeds from said bowl to said stem.

2. The device as specified in claim 1, said stem being constructed of transparent material, whereby the seeds, during their travel through the stem, may be visible.

3. The device as specified in claim 1, said stem, at its exit end, being provided with an extended lower lip.

MAX SCHLING.